United States Patent [19]

Isern

[11] Patent Number: 5,031,961
[45] Date of Patent: Jul. 16, 1991

[54] SEAT BELT MOUNTING ASSEMBLY
[75] Inventor: Karl H. Isern, Dearborn, Mich.
[73] Assignee: Ford Motor Company, Dearborn, Mich.
[21] Appl. No.: 443,422
[22] Filed: Nov. 29, 1989
[51] Int. Cl.⁵ .............................. B60R 22/04
[52] U.S. Cl. ........................ 297/473; 297/468; 280/804
[58] Field of Search ............ 297/468, 475, 473, 484; 280/801, 804, 807

[56] References Cited
U.S. PATENT DOCUMENTS

| | | | |
|---|---|---|---|
| 4,248,480 | 2/1981 | Koucky et al. | 297/473 |
| 4,262,963 | 4/1981 | Bauer et al. | 503/206 |
| 4,294,468 | 10/1981 | Kinoga et al. | 297/475 |
| 4,349,216 | 9/1982 | Pilarski | 280/807 |
| 4,482,188 | 11/1984 | Tilly et al. | 297/468 |
| 4,676,555 | 6/1987 | Tokugawa | 297/473 |
| 4,676,556 | 6/1987 | Yamanoi et al. | 297/473 |
| 4,720,072 | 1/1988 | Kitano et al. | 248/429 |
| 4,726,616 | 2/1988 | Nishimura | 297/473 |
| 4,729,602 | 3/1988 | Tokugawa | 297/468 |
| 4,818,022 | 4/1989 | Nishimura | 280/804 |
| 4,822,104 | 4/1989 | Plesniarski | 297/468 |

Primary Examiner—Kenneth J. Dorner
Assistant Examiner—Cassandra Hope
Attorney, Agent, or Firm—Daniel M. Stock; Roger L. May

[57] ABSTRACT

An automotive seat assembly has a mounting arrangement for seat belt componentry which allows the fore and aft movement of the componentry with the seat and effects load transfer from the seat belt to the automotive vehicle body in a manner suitable for mounting a seat belt retractor in the longitudinally movable environment.

18 Claims, 2 Drawing Sheets

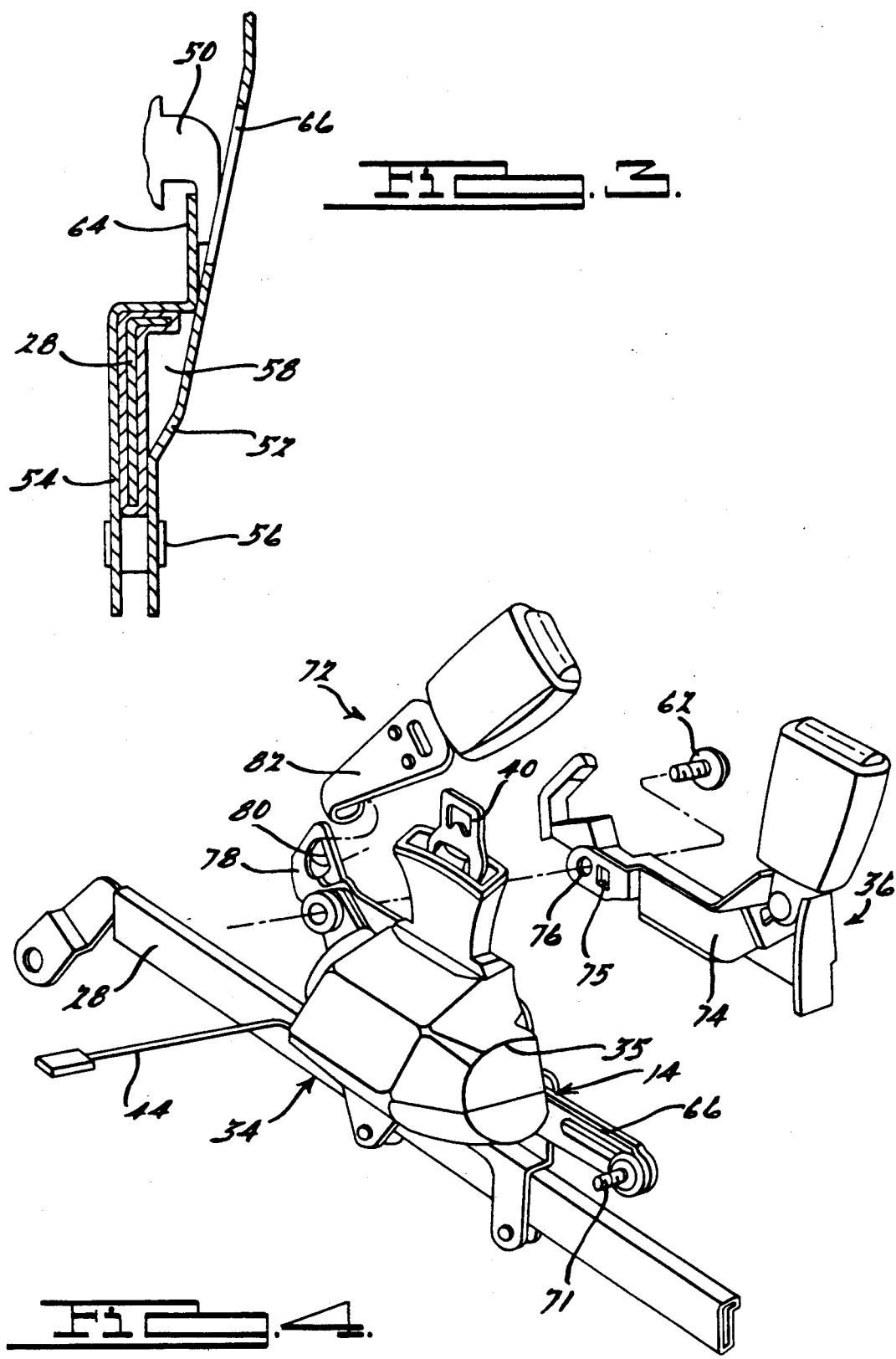

SEAT BELT MOUNTING ASSEMBLY

BACKGROUND OF THE INVENTION

The present invention relates to mounting arrangements or anchors for seat belt components used in the occupant restraining systems of automotive vehicles. The invention relates more specifically to a mounting arrangement for seat belt components permitting their forward and rearward movement with the automobile seat with which they are associated.

DESCRIPTION OF THE PRIOR ART

The mounting of a seat belt buckle on a locking sliding rail for fore and aft movement with the seat with which the buckle is associated is known in the vehicle occupant restraint arts. U.S. Pat. No. 4,248,480 to Koucky et al. is exemplary of such mounting arrangements. The mounting arrangement taught by Kouchky et al., however, is limited to the mounting of a relatively simple seat belt structure, such as a seat belt buckle. In some modern vehicle occupant restraint systems, however, the seat belt system components which may be required to move longitudinally with the vehicle seat are not limited to buckle components. The increased difficulty in handling the adverse loading conditions presented by the mounting of relatively complicated and massive structures, such as presented by a retractor assembly have been addressed in the automotive industry by mounting retractor assemblies in a longitudinally movable environment by direct fixed attachment to moving portions of the vehicle seat. This necessitates a structural design for such movable seat parts for withstanding the abnormal loading requirements of emergency occupant restraint. This, of course, adversely affects the cost and weight of such components.

SUMMARY OF THE INVENTION

Responsive to the deficiencies in the prior art, it is an object of the present invention to provide an improved mounting assembly for seat belt components in a longitudinally movable automotive vehicle seat which defines a load path for reacting to seat belt loads imposed on the seat belt components which does not pass through movable portions of the vehicle seat.

It is a further object to provide such a mounting assembly which is appropriately configured to support the loading conditions encountered in a seat belt retractor environment.

According to one feature of the present invention, a longitudinally extending slide bar is secured to a fixed portion of the vehicle seat through which the seat is secured to the vehicle floor and a collar is slidably mounted on the bar which includes vertically spaced attachment provisions for securing the seat belt component to the collar.

According to another feature of the invention, provision is made for attaching a seat belt buckle to the collar upon which the seat belt retractor is mounted.

According to another feature of the invention, the collar is formed of a pair of facing plates surrounding the slide bar for sliding engagement upon it, and the plates include struck-out portions defining a catch, and the retractor includes a hook for facilitating assembly engagement and resistance to lateral or rotary movement of the retractor under load.

BRIEF DESCRIPTION OF THE DRAWINGS

These and other objects and features will become apparent to those skilled in the vehicle occupant restraint arts upon reading the following description with reference to the accompanying drawings wherein like numbers refer to like parts throughout the several figures and in which:

FIG. 3 is a cross-sectional view of a portion of the improved mounting assembly of the present invention showing the catch and hook attachment mechanism for the retractor assembly; and FIG. 4 is an exploded perspective view of an alternative mounting assembly according to the present invention.

DESCRIPTION OF THE PREFERRED EMBODIMENTS

Figure 1:
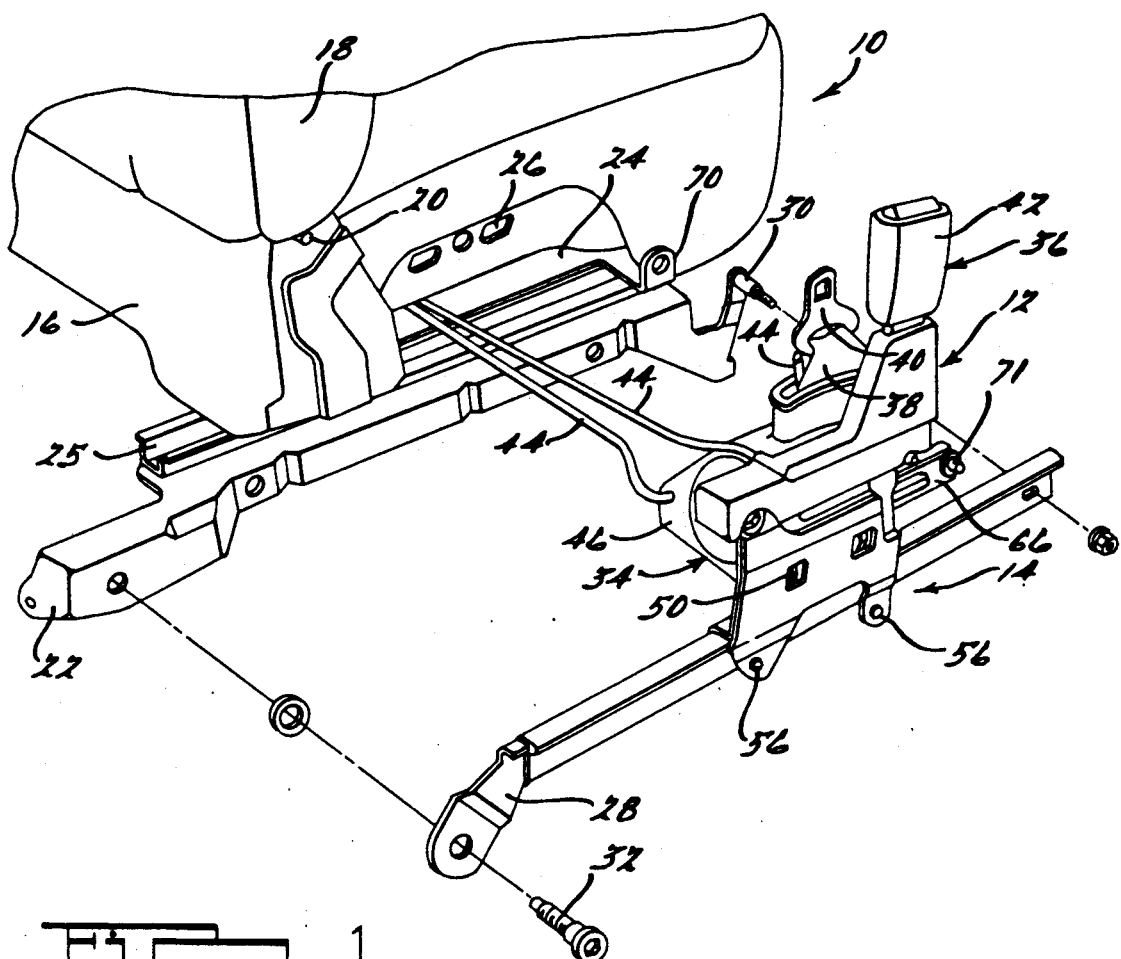
FIG. 1 is an exploded perspective view of the improved mounting assembly of the present invention illustrating its assembly with respect to an automotive vehicle seat.

Turning now to the drawings and particularly to FIG. 1 thereof, the simple and economical manner in which seat belt componentry is mounted for forward and rearward movement with an automotive vehicle seat is illustrated. It is to be understood that an occupant of an automotive vehicle seat is best restrained by a seat belt system when the anchoring components which react to the imposition of occupant restraining loads are maintained in a substantially fixed position relative to the occupant's seating position.

In FIG. 1, the mounting arrangement according to the present invention is illustrated as comprising generally an automotive vehicle seat assembly 10, a seat belt component assembly 12 and a mounting assembly 14 longitudinally movable with respect to the seat assembly 10. The seat assembly 10 is illustrated as comprising a generally horizontal seat cushion 16 and an upright seat back 18, which may be pivotally mounted as indicated at 20 to the seat cushion 16. These components are mounted for longitudinally forward and rearward movement with respect to the vehicle through a lower fixed track 22, having an upward opening channel 25 portion as can be seen at the left side of FIG. 1, which is fixedly secured to the vehicle floor in a known fashion and an upper movable track 24. The actual construction of the tracks 22, 24 and their cooperation with the seat cushion 16 is not illustrated here and description is deemed unnecessary since many varieties of automotive seat are available and known to those skilled in the art. For purposes of the present invention, it is important to appreciate, however, that the upper movable track 24 is joined for movement with the seat cushion 16 and is generally less massive than the lower track 22 to facilitate movement of the seat. The movement may be effected in vertical directions, as well as the longitudinal directions mentioned and may be effected through agency of power assist devices which may be actuated through seat mounted controls, as indicated at 26. According to the present invention, a longitudinally extending slide rail 28 is fixedly secured to the fixed track 22 as by threaded fasteners indicated at 30, 32. This slide rail 28 is preferably of the type described in the previously mentioned U.S. Pat. No. 4,248,480 to Koucky et al., which is incorporated herein by reference. In the preferred embodiment, however, it is mounted as has been described to the fixed track 22, rather than directly to the vehicle floor, as shown in Koucky et al.

The seat belt component assembly 12, as illustrated in FIG. 1, comprises a retractor assembly 34 and a buckle assembly 36. This component arrangement is particularly suitable for use in automotive vehicles which employ a passive seat belt system for occupant restraint. The retractor assembly 34 is preferably utilized in storing and adjustably positioning seat belt webbing 38 terminating in a buckle tongue 40 which is secured to an anchor, not shown, elsewhere in the vehicle body for operation as a torso belt extending across the torso of a seated occupant. The buckle assembly 36 presents a tongue-receiving buckle 42 for releasably securing another tongue of a seat belt, not shown, which is stored on the opposite side of the seat 10 to function as a lap belt. Electrical wiring connections, indicated generally at 44, connect the seat belt component assembly 12 to the electrical system of the vehicle, not shown.

Figure 2:
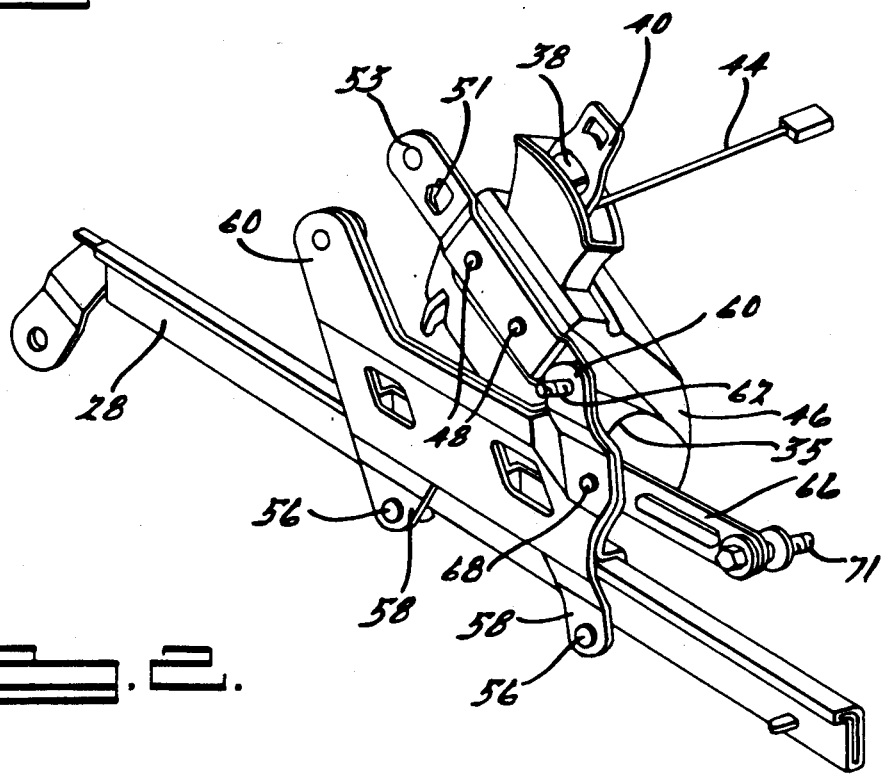
FIG. 2 is a perspective view of the invention mounting assembly viewed from the outside with respect to the vehicle seat with which it is associated showing the retractor assembly rotated out of position prior to final assembly.

The mechanical construction of the retractor assembly 34 and the buckle assembly 36 are not themselves important to the practice of the present invention. Those familiar with the vehicle occupant restraint arts, however, will appreciate that the retractor assembly 34 is a relatively massive mechanism which employs some form of spring-loaded take-up reel, the circular shape of the end of which is indicated at 35, to control the protraction and retraction of the belt 38 with respect to a housing 46. For purposes of the present invention, it is necessary to understand that the housing 46 make provision for upper and lower vertically spaced fastening elements 48, 50, respectively, placed above and below the reel. In the preferred embodiment illustrated, the upper fastening element 48 comprises a pair of laterally spaced rivets and the lower fastening element 50 comprises a pair of laterally spaced downwardly extending hooks. The upper fastening elements 48 effect the fixed securement of a longitudinally extending profiled strap 53 through which the simple and efficient attachment of the retractor assembly 34 to the mounting assembly 14 is effected, as may best be seen in FIG. 2.

Turning now to the mounting assembly, it is illustrated as comprising a pair of plates, including an outer plate 52 and an inner plate 54 joined together and maintained in spaced-apart relationship by a pair of shouldered pins 56 for defining a channel 58 slidingly receiving a slide rail 28, as may best be seen in FIG. 3. The pins 56 are received in depending mounting tabs 58 and are configured to lockingly engage the undersurface of the slide rail 28 upon the imposition of 52, 54, also include a pair of upstanding mounting ears 60 receiving threaded fasteners, such as indicated at 62, for fixedly securing the mounting strap 53, and hence, the retractor assembly 34 to the mounting assembly 14. A struck-out catch portion 64 is formed on the inner plate 54 in two longitudinally spaced locations, as shown, and a corresponding aperture 66 is formed through the outer plate 52 in registration with the catch 64 to provide clearance for the hooks 50 to be dropped into engagement with the catch portion 64, as may best be seen in FIGS. 2 and 3.

With the retractor assembly 34 so mounted on the mounting assembly 14, it will be appreciated that loads imposed by the occupant of the seat assembly 10 upon the seat belt webbing 38 will be supported by massive structure of the vehicle, the load being transferred through the retractor assembly 34 to the mounting assembly 14 and to the slide bar 28 to the fixed track 22, and hence, to the vehicle floor. Lateral or pivotal loads on the retractor 34 will be resisted by the cooperation between the hooks 50 and the catch portion 64, likewise ultimately constrained by the track mounted slide bar 28. It will be appreciated that in mounting the retractor assembly 34 for movement along the slide bar 28 as described may tend to transmit a load of the belt 38 through the reel which will tend to pull the retractor assembly pivotally about its upper supports 48. This tendency is simply and efficiently resisted by the hooks 50.

Forward and rearward movement of the retractor assembly 34 is facilitated by the provision of the linkage member 66 pivotally mounted as at 68 to the plates 52, 54, at one end and to a mounting ear 70 of the movable upper track 24 of the seat assembly 10 through a fastener 71.

Turning lastly to FIG. 4, the simple and effective means whereby the buckle assembly 36 is fixed to the mounting assembly 14, as well as the manner in which the mounting assembly 14 may be modified to permit the mounting of an auxiliary buckle assembly 72, is illustrated. The buckle assembly 36 is illustrated as including a mounting arm 74, including the through aperture 76 for receiving the threaded fastener 62 to clampingly mount the buckle assembly 36 to the inner and outer plates 52, 54 at the same location at which the strap 53 is joined. The arm 74 may be configured to have a second aperture 75 for engaging a struck out tab 51 of the strap 53 to resist rotation of the buckle assembly 36 about the fastener 62.

In the embodiment illustrated, an auxiliary plate 78 may be mounted laterally outwardly of the outer plate 52, which includes aperture 80 for receiving a hook-like end 82 of the auxiliary buckle 72 for ease of installation. Provision of such a mounting feature permits the use of an auxiliary buckle 72 for cooperation with other seat belt structure for retaining devices, such as child seats.

While only certain embodiments of the seat belt component mounting system of the present invention have been disclosed, other may be possible without departing from the scope of the appended claims.

We claim:

1. An attachment assembly for mounting a seat belt retractor of the type having a take up reel to a longitudinally extending slide bar positioned laterally adjacent a longitudinally movable seat of the type mounted in an automotive vehicle and having a fixed seat track mounted to the vehicle body and a movable seat track, the assembly comprising:

a collar slidably mounted on said slide bar and operatively connected with said movable seat track for forward and rearward therewith; and vertically spaced upper and lower attachment means for fixedly securing said retractor to said collar, said lower attachment means comprising a hook and catch mechanism operatively disposed between said collar and said retractor.

2. An improved mounting assembly as defined in claim 1, wherein said first seat belt component is a seat belt retractor assembly.

3. An improved mounting assembly as defined in claim 1 and further comprising a third attachment means for fixedly securing a second seat belt component to said collar.

4. An improved mounting assembly as defined in claim 2 and further comprising a third attachment means for fixedly securing a second seat belt component to said collar.

5. An improved mounting assembly as defined in claim 4, wherein said second seat belt component is a seat belt buckle.

6. An improved mounting assembly as defined in claim 5 and further comprising a fourth attachment means for fixedly securing an auxiliary seat belt buckle to aid collar.

7. An improved mounting assembly as defined in claim 1, wherein said collar comprises a first plate positioned laterally inwardly with respect to said slide bar and a second plate positioned laterally outwardly with respect to said slide bar, said plates being fixedly secured to each other and having means defining a channel therebetween for slidable mounting on said slide bar.

8. An improved mounting assembly as defined in claim 7, wherein one of said vertically spaced attachment means comprises catch means carried with said plates and wherein said first seat belt component comprises hook means operatively engaging said catch means to restrain said first seat belt component against lateral movement.

9. An improved mounting assembly as defined in claim 8, wherein said one attachment means is said lower attachment means.

10. An attachment assembly for mounting a seat belt retractor of the type having a take up reel to a longitudinally extending slide bar positioned laterally adjacent a longitudinally movable seat of the type mounted in an automotive vehicle and having a fixed seat track mounted to the vehicle body and a movable seat track, the assembly comprising:
   a collar slidably mounted on said slide bar and operatively connected with said movable seat track for forward and rearward movement therewith; and
   vertically spaced upper and lower attachment means, said lower attachment means comprising a hook and catch mechanism, for fixedly securing said retractor to said collar.

11. An improved mounting assembly as defined in claim 10, wherein said first seat belt component is a seat belt retractor assembly.

12. An improved mounting assembly as defined in claim 10 and further comprising a third attachment means for fixedly securing a second seat belt component to said collar.

13. An improved mounting assembly as defined in claim 11 and further comprising a third attachment means for fixedly securing a second seat belt component to said collar.

14. An improved mounting assembly as defined in claim 13, wherein said second seat belt component is a seat belt buckle.

15. An improved mounting assembly as defined in claim 14 and further comprising a fourth attachment means for fixedly securing an auxiliary seat belt buckle to aid collar.

16. An improved mounting assembly as defined in claim 10, wherein said collar comprises a first plate positioned laterally inwardly with respect to said slide bar and a second plate positioned laterally outwardly with respect to said slide bar, said plates being fixedly secured to each other and having means defining a channel therebetween for slidable mounting on said slide bar.

17. An improved mounting assembly as defined in claim 16, wherein one of said vertically spaced attachment means comprises catch means carried with said plates and wherein said first seat belt component comprises hook means operatively engaging said catch means to restrain said first seat belt component against lateral movement.

18. An improved mounting assembly as defined in claim 17, wherein said one attachment means is said lower attachment means.

* * * * *

UNITED STATES PATENT AND TRADEMARK OFFICE
CERTIFICATE OF CORRECTION

PATENT NO. : 5,031,961

DATED : July 16, 1991

INVENTOR(S) : Isern, Karl H.

It is certified that error appears in the above-identified patent and that said Letters Patent is hereby corrected as shown below:

On the title page, item [75] should read as shown:

-- Inventor: Karl H. Isern, Dearborn, Michigan
             Anthony J. Valasin, Detroit, Michigan --

Signed and Sealed this

Second Day of February, 1993

*Attest:*

STEPHEN G. KUNIN

*Attesting Officer*      Acting Commissioner of Patents and Trademarks